Figure 1:
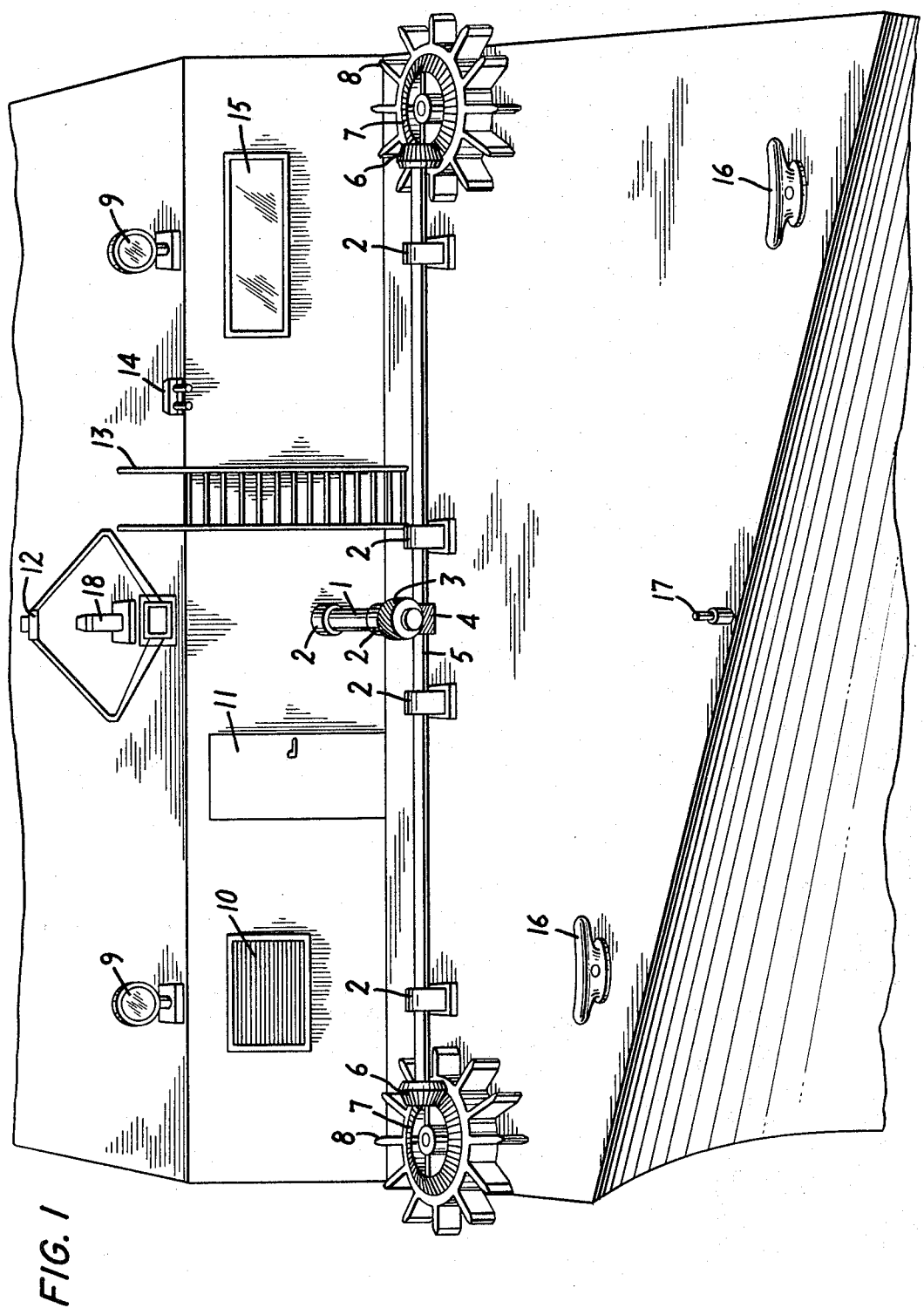

March 28, 1967     B. J. O'NEILL     3,311,082
TRACK PROPULSION FOR FERRIES
Filed Dec. 29, 1964

March 28, 1967  B. J. O'NEILL  3,311,082
TRACK PROPULSION FOR FERRIES
Filed Dec. 29, 1964  8 Sheets-Sheet 2

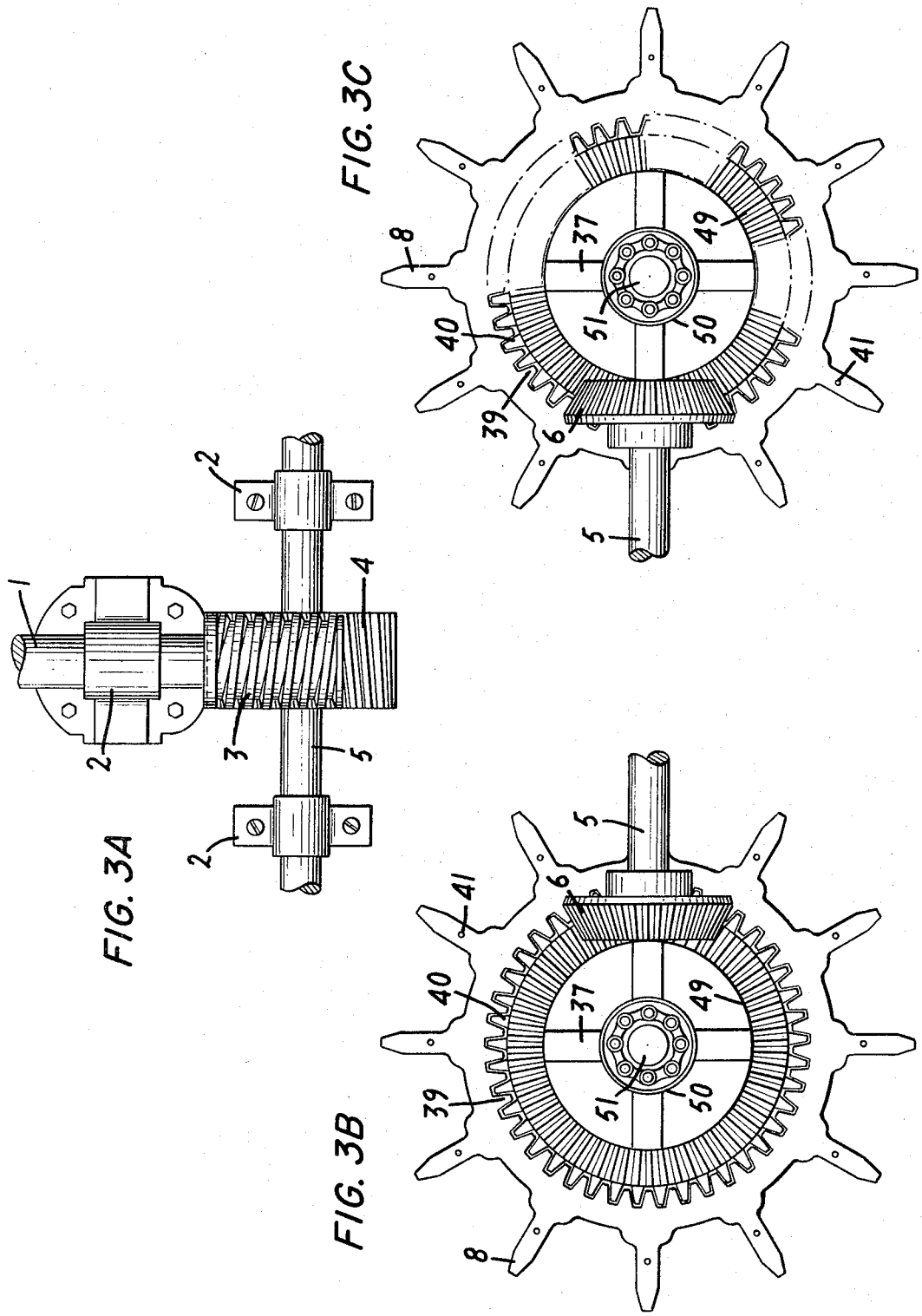

March 28, 1967 B. J. O'NEILL 3,311,082
TRACK PROPULSION FOR FERRIES
Filed Dec. 29, 1964 8 Sheets-Sheet 4
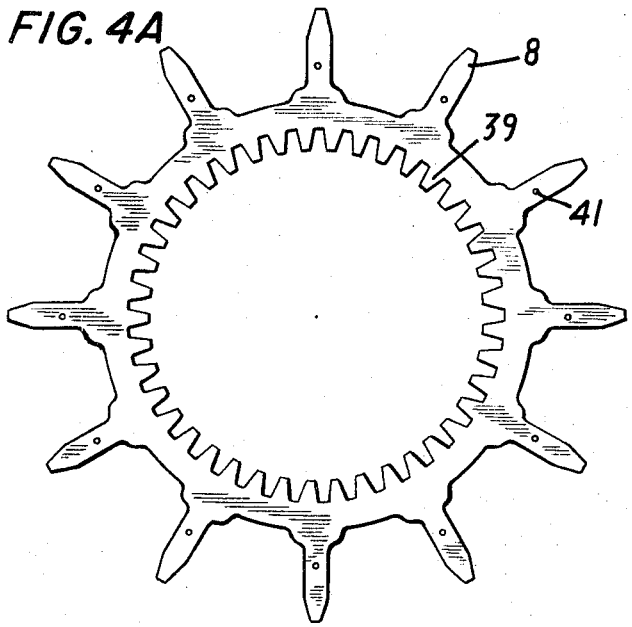
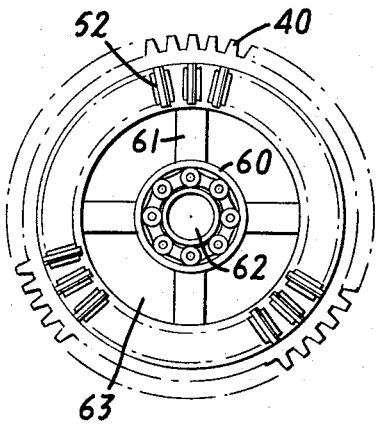
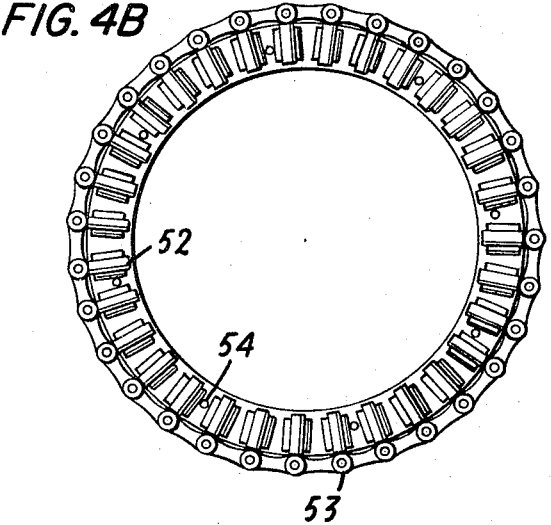
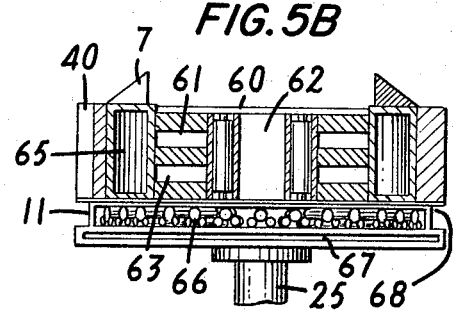
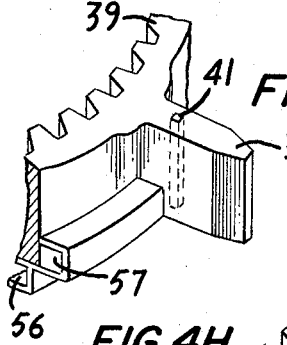
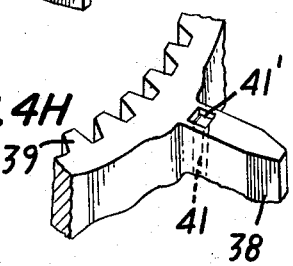
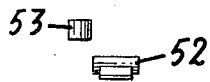
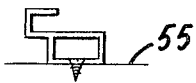
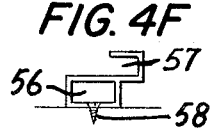
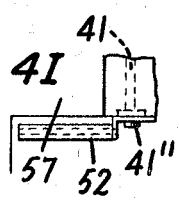

March 28, 1967  B. J. O'NEILL  3,311,082
TRACK PROPULSION FOR FERRIES
Filed Dec. 29, 1964  8 Sheets-Sheet 6
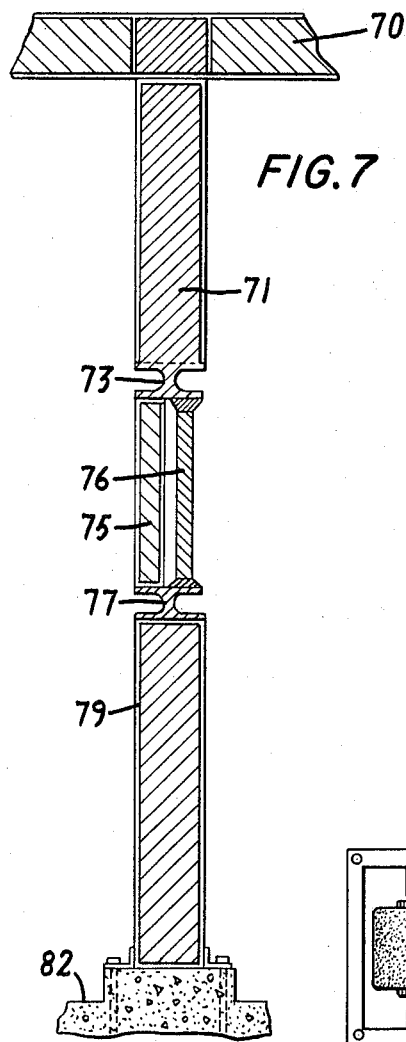
FIG. 7
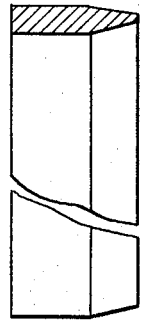
FIG. 9A
FIG. 9B
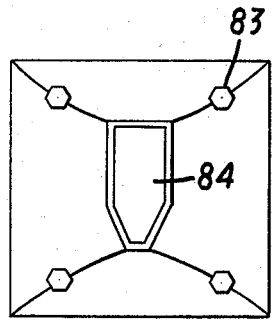
FIG. 9C
FIG. 9D
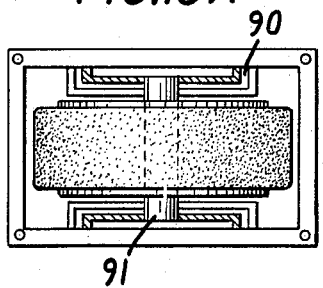
FIG. 10A
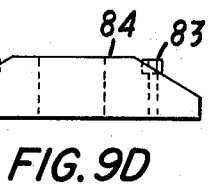
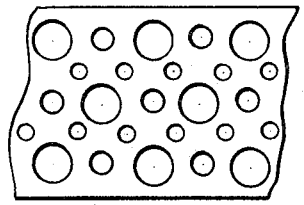
FIG. 8
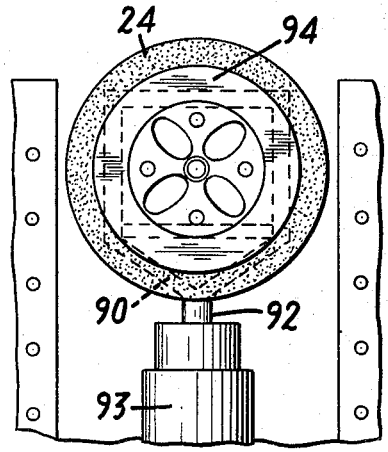
FIG. 10B

United States Patent Office 3,311,082
Patented Mar. 28, 1967

3,311,082
TRACK PROPULSION FOR FERRIES
Bert J. O'Neill, 210—20 53rd Ave.,
New York, N.Y. 11364
Filed Dec. 29, 1964, Ser. No. 421,955
5 Claims. (Cl. 115—8)

This invention relates to a new and useful system in the field of mass transportation. Specifically, this invention relates to a water transportation system comprising a water vessel and guide means for the water vessel; the water vessel may be characterized as a mechanical ferry barge, hereinafter referred to as MFB, and represents a new type of fast, safe, dependable mass-transportation for heavily populated areas and, with some revision of facilities, between countries, where practical.

The MFB system of the present invention provides identical twin ferry barges operating in an underground tunnel, each in its own lane, with a designated home base at the end of the system furthest from the congested area. Each MFB has a duplicate bow and stern motivating mechanism. There are no reverse gears.

Typically, as herein described each vessel may have a beam of forty-two feet and an overall length of four hundred eighty feet, with forty foot bow and stern areas apportioned for the mechanical operation of the vessel. The bow, from a functional standpoint, would be the front area of each MFB facing away from the home base.

Twin decks are provided, each typically with seven feet headroom, and with approximately sixteen thousand square feet of passenger (or cargo) space.

The vessels may be constructed in their own pens, which would subsequently become the repairing and drydocking facilities. Each MFB would shuttle to and from its destination in its own lane.

A speed of thirty-five m.p.h. may be obtained by using diesel-powered engines, with a passenger-carrying capability of seven thousand five hundred persons per trip.

The overall tunnel width typically may be one hundred sixty feet.

The diesel engines are geared to rotate a central drive shaft which protrudes through the top deck, fore, thence to worm-driven bevelled gears which in turn rotate the horizontal drive shaft. The top deck, aft, would have an identical system.

The horizontal drive shaft is capped by pinion gears which in turn rotate the typically six feet in diameter drive wheel in a bevel-engaging action. There is no reversing system, the opposite system being used to reverse the MFB when required.

Twelve steel "paddle" wheels are placed equidistantly around the circumference of the port and starboard drive wheels and when in motion contact equidistantly-located vertical steel rails permanently based at proper levels and heights along center and supporting walls of the tunnel at a distance typically twenty and nine-tenths inches apart at dead center.

A straight line of travel, without curves, is recommended as best suited to the operation of the MFB system.

The overall length of the tunnel would be subject to the particular transportation problem involved.

The required water depth in each tunnel lane is typically twelve feet. The water areas of each tunnel lane would be separated except at both ends where they would meet in continuous flow.

With full passenger load typically a draft of six feet, six inches would be required.

A space of eight inches for example, may be provided between tunnel walls and the sides of the MFB.

To maintain stability and steadiness, for example eight heavy, solid rubber bumper wheels are provided, four each topside and four each bottom-positioned on the starboard side, and a duplicate arrangement of units on the port side. A tolerance of two inches may typically be provided between bumper wheels and the tunnel walls, i.e., a total wheel tolerance of four inches.

These units may begin at a point for example thirty-two feet from the bow and spaced equidistantly, one hundred thirty-eight feet, three hundred nine feet and four hundred forty-eight feet from the initial installation.

The bottom units are permanent installations but the topside units are mobile and perform a braking function as well as a stabilizing bumper action.

A great amount of inherent braking would take place merely by the disengagement of the forward wheel drives, when the MFB would brake itself against the oncoming water.

An overhead "third-rail" electric system is indicated to supply the necessary voltage to operate communications, controls, lighting, ventilation and all other auxiliary systems required.

Air vents and escape stairways are planned to be located strategically throughout the tunnel area.

Figure 2A:
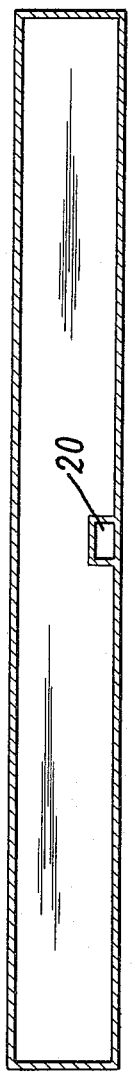
Figure 2B:
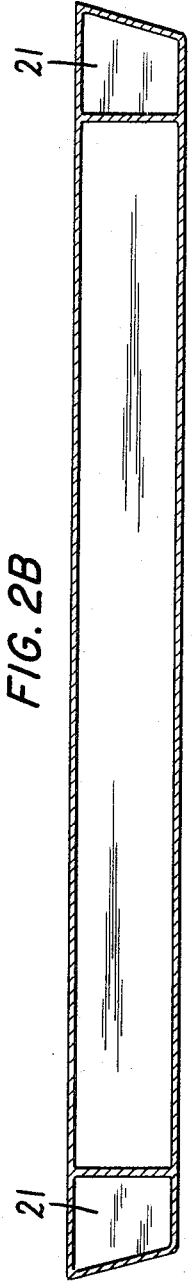
Figure 2C:
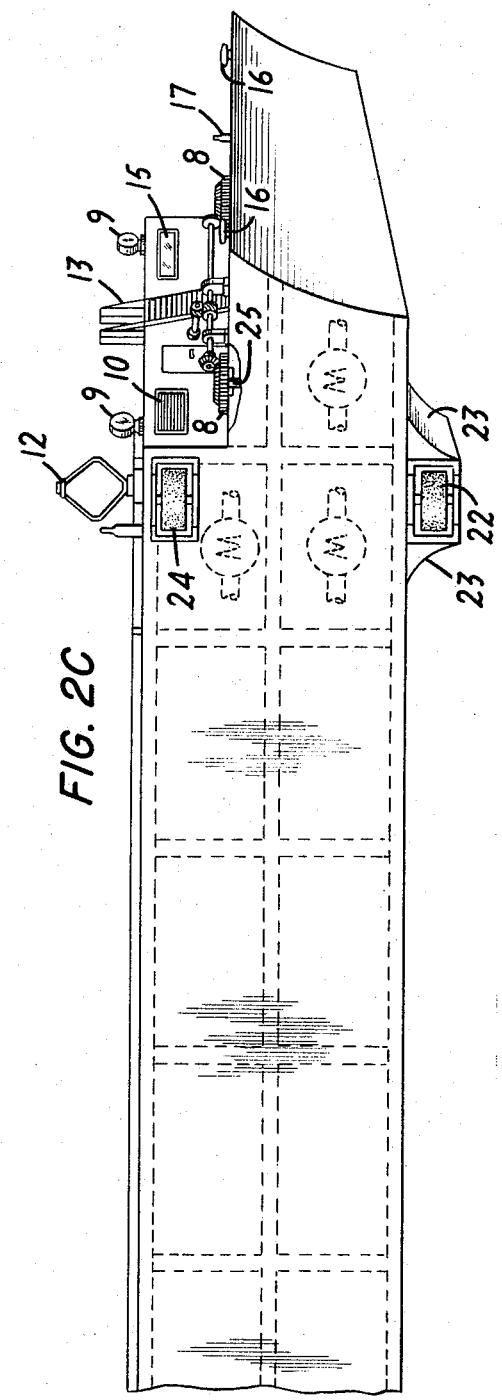
Figure 6:
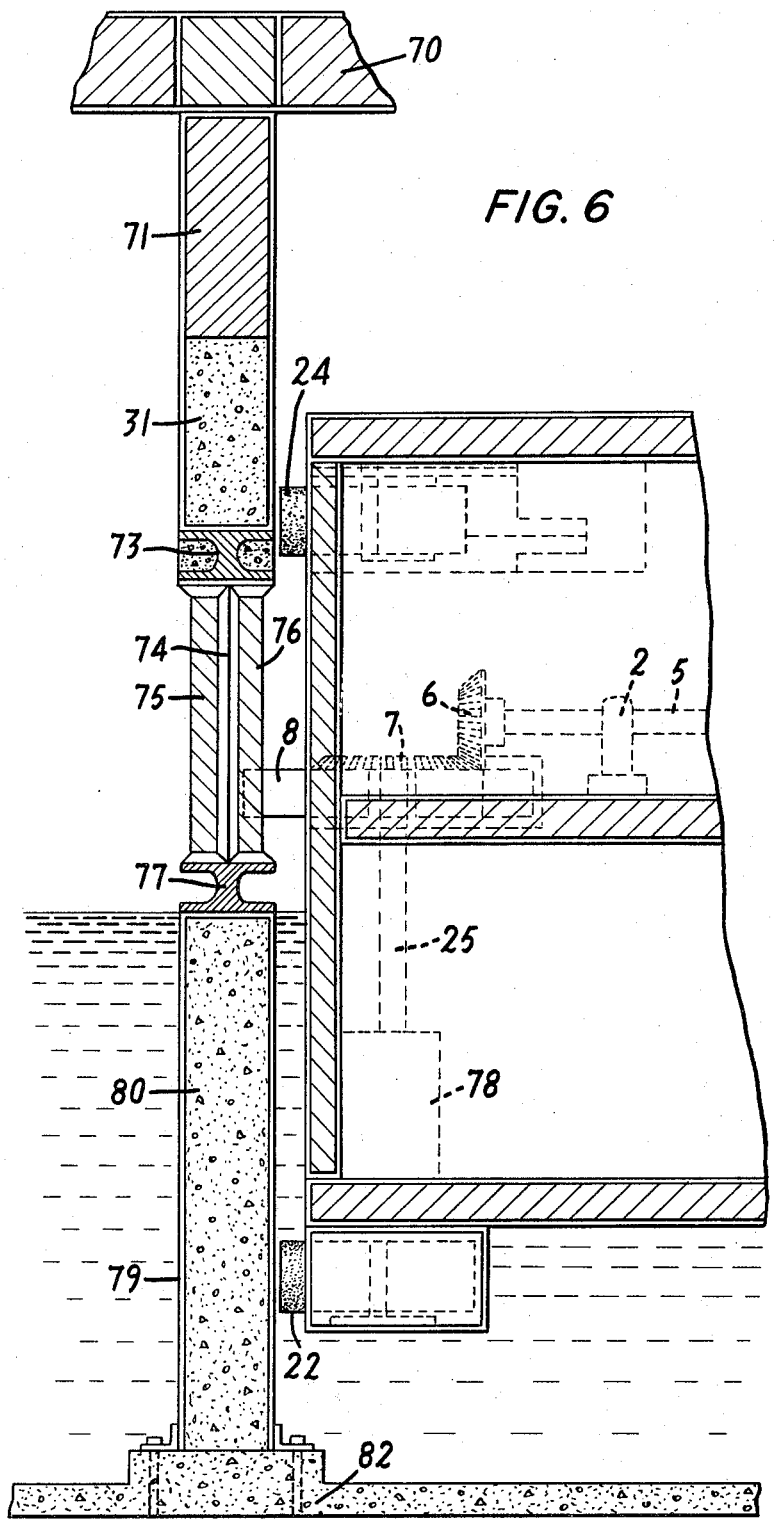
Figure 11:
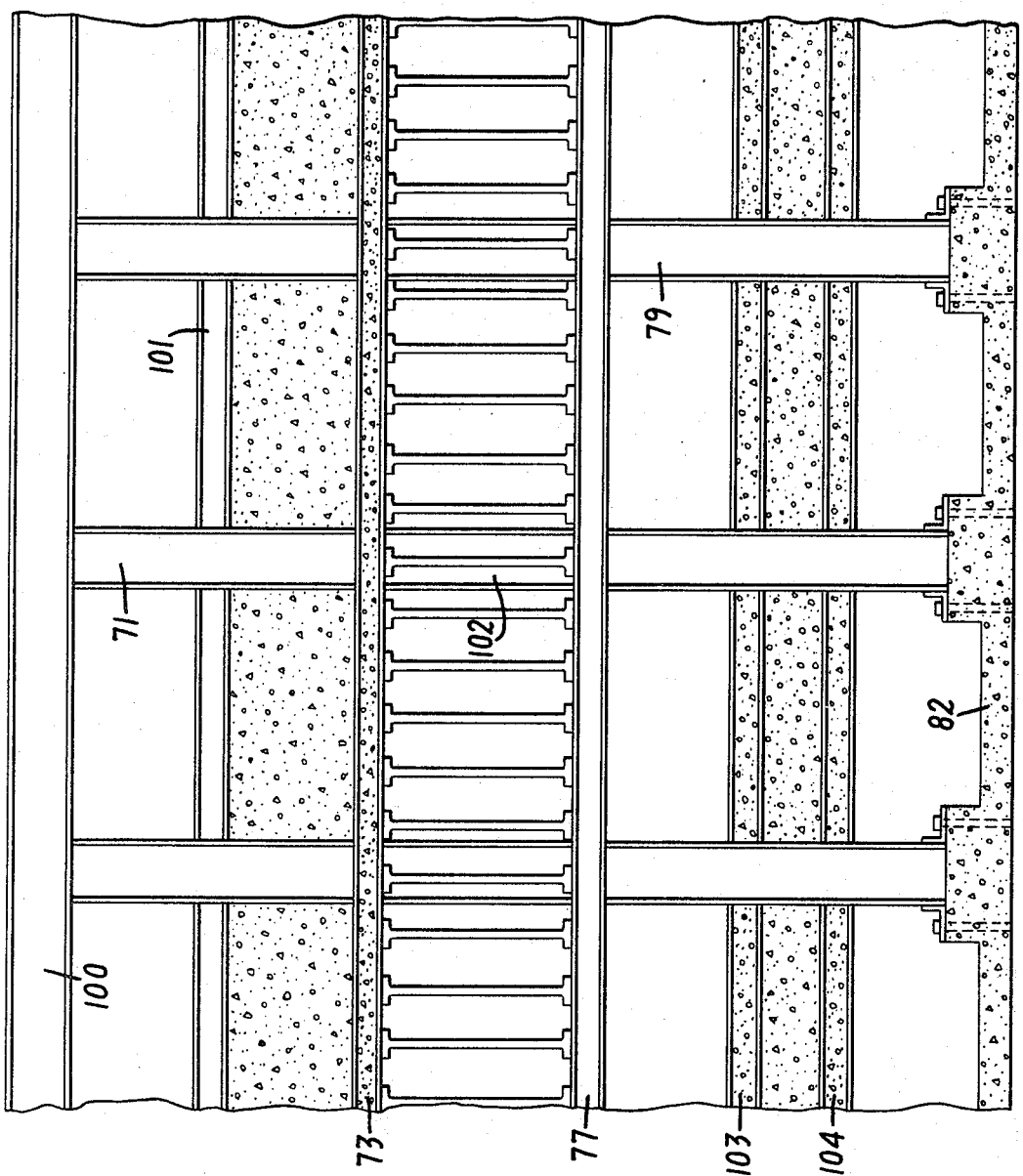
Figure 12A:
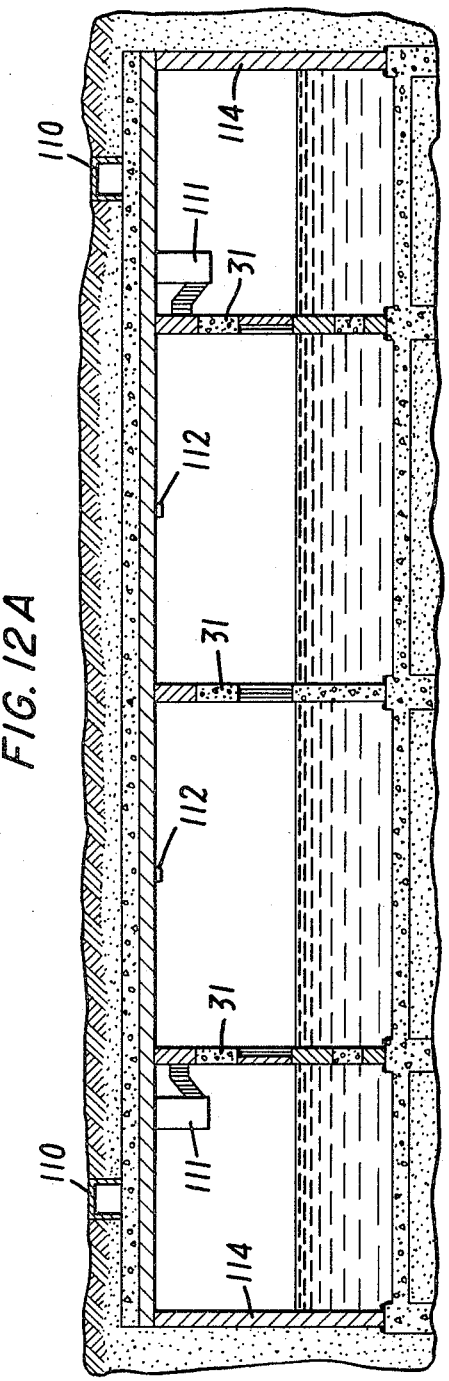
Figure 12B:
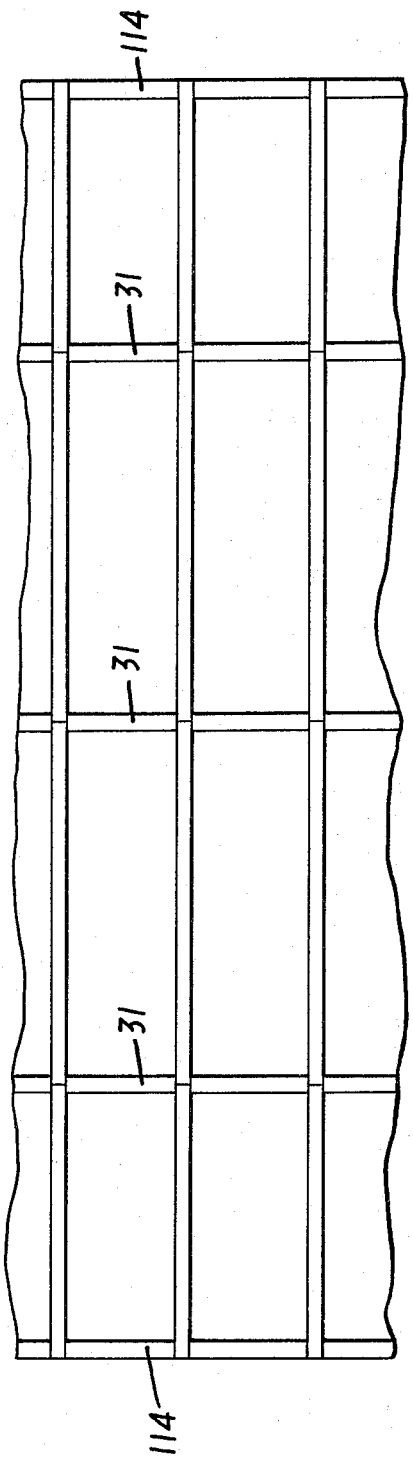

In the drawings:
FIG. 1 is a front perspective view of an end of an MFB;
FIGS. 2A and B are side elevations of the upper and lower decks, respectively, of an MFB;
FIG. 2C is a side elevation of an end of an MFB;
FIGS. 3A, B and C are plan views of the gearing arrangement from the main drive shaft and the gearing arrangements for driving right and left paddle wheels, respectively;
FIGS. 4A to I are details of the structure and bearing arrangements of each of the paddle wheels;
FIGS. 5A and B are details of the structure and bearing arrangements of the gear means for driving each of the paddle wheels;
FIG. 6 is a front elevation, partly in cross section, of the tunnel structure and the structure of the MFB cooperating therewith;
FIG. 7 is a front elevation, partly in cross section, of a fragment of the tunnel structure;
FIGS. 8 and 9A to D are details of the tunnel structure;
FIGS. 10A and B are a front elevation and a plan view, respectively, of the brake-and-bumper structure of the MFB;
FIG. 11 is a side elevation, partly in cross section, of the tunnel structure;
FIG. 12A is a front elevation, partly in cross section, of the entire tunnel structure;
FIG. 12B is a plan view of the ceiling beam structure of the tunnel.

The vessel is provided with a main drive shaft from the engine room, supported by housings 2 which also support a horizontal drive shaft 5. The main and horizontal shafts are opeartively connected by means of a worm drive 3 and a worm gear 4. Pinion gears 6 provided at the ends of the drive shaft 5 engage bevel gears 7 on inner drive wheels which engage outer paddle wheels 8. The vessel is also provided with searchlights 9, a ventilator 10, a door 11 to the engine room, a trolley 12 for an overhead third rail, a ladder 13 to the top of the vessel, a whistle 14, an observation window 15, cleats 16, a standard bearer 17 and a diesel exhaust 18 (FIG. 1). There is also provided a control and communications center 20 (FIG. 2A) and engine rooms 21 (FIG. 2B).

A stationary bumper wheel 22 is positioned beneath the hull of the vessel and is guarded by plates 23 (FIG. 2C). There is also provided a moveable bumper wheel 24 at the decks-level of the vessel. An axially displaceable shaft 25 is provided to engage and disengage the inner drive wheel from the paddle wheel 8.

The inner drive wheel is provided with spokes 37 and the paddle wheel is provided with paddles 38. The paddle wheel is also provided with internal gear teeth 39 which engage external gear teeth 40 of the inner drive wheel. Each paddle is provided with a hole 41 for a bolt (FIGS. 3B and C). The arrangement whereby the main drive shaft is interconnected to the horizontal drive shaft may better be appreciated from a detail view (FIG. 3A).

A bevel gear 49 is provided on the inner drive wheel to engage the pinion gear at each end of the horizontal drive shaft. The inner drive wheel is provided with a roller bearing housing 50. The center 51 of the inner drive wheel is open.

The outer drive wheel is supported by horizontal and vertical bearings 52 and 53, respectively, mounted in an undercarriage. The undercarriage is bolted to the desk 55 through holes 54. The undercarriage is provided with a horizontal roller bearing installation area 56 and a vertical roller bearing installation area 57. The bolts 58 fasten the undercarriage to the deck 55. (FIGS. 4A to I.)

The inner drive wheel is provided with spokes 61, an opening 62 through its center and open areas 63 between the spokes. The inner drive wheel is supported and guided for rotation vertically by roller bearings 60 and horizontally by roller bearings 66 which are mounted on an undercarriage comprising a base 67 and an annulus and top 68. Hollows 65 are provided beneath the beveled gear 7. (FIGS. 5A and B.)

The roof of the tunnel is braced by ceiling cross beams 70. Rails 75 and 76, which are each provided with upper and lower support flanges, are supported between upper lateral beam 73 and lower lateral beam 77, the details of which structure are shown in FIGS. 9A to D. The flanges of the rails 75 and 76 are provided with bolt holes 83 for fastening of the flanges to the upper and lower lateral beams 73 and 77 and are also provided with central openings 84 for insertion of the rails (FIGS. 9C and D). A hole-containing plate 74 (shown in more detail in FIG. 8) is provided between the rails 75 and 76. Vertical beams 71 extend from ceiling cross beams 70 to the upper lateral beam 73. Between the vertical beams 71 and resting on the upper lateral beam 73 there is provided a concrete wall 31. Main vertical support beams 79 are bolted to a footing 82 at the base of the tunnel. Concrete wall 80 is provided between the main vertical support beams (FIGS. 6 and 7).

In the vessel there is provided a motor area 78 to accommodate a motor for providing pneumatic power to operate the shaft 25 which raises and lowers the inner gear wheel. Freely rotatable tires 22 constituting bumpers are provided at the bottom of the hull along the periphery of the hull. Freely rotatable tire 24, which are provided with means for urging them against the walls of the tunnel and thereby constitute brake means as well as bumper means, are provided topside along the sides of the hull. (FIG. 6.)

Each of the tires 24 is mounted on a mobile frame 90 by means of a vertical shaft 91. A compressor and motor 93 provide pneumatic power to axially displace a shaft 92 which provides translational movement to the mobile frame 90 thereby urging the bumper and brake tire 24 against the tunnel wall. The tire is interconnected to a wheel hub 91 by means of an annular metal flange 94 integral with the hub. (FIGS. 10A and B.)

The ceiling of the tunnel is provided also with longitudinal ceiling support beams 100. Lateral support beams 101 provide additional support for the vertical beams 71 and for the wall 31. Vertical beams 102 reinforce the tunnel structure in the area of the rails. Lateral support beams 103 and 104 reinforce the lower walls of the tunnel. (FIG. 11.)

The tunnel is provided with ventilators 110 opening to the surface of the ground (FIG. 12A). The tunnel is also provided with emergency walk-ways and motorcycle patrol roadways 111. To provide electric power to the vessels the tunnels are provided with "third rails" 112 which engage the trolleys 12 of the vessels. The tunnel is provided with outer walls 114, which have heretofore not been described but are simply of conventional concrete and steel beam construction. (FIG. 12A.) The network of cross and longitudinal ceiling beams (FIG. 12B) firmly supports the ground above the tunnel.

In operation, the paddle wheels engage the vertical rails whereby the vessels are propelled along the center to tunnel lanes.

The invention is not to be construed as limited to the particular form disclosed herein, since this is to be regarded as illustrative rather than restrictive.

I claim:

1. A water transportation system comprising a water vessel and guide means for said water vessel, said water vessel comprising a hull, drive means disposed at opposed ends of said hull, each of said drive means being adapted to be operatively connected to a prime mover and comprising a pair of paddle wheels rotatably mounted at opposed sides of the hull in a horizontal plane with their peripheries extending outwardly from said opposed sides, said guide means comprising at each side of the vessel a series of horizontally spaced vertical members mounted in fixed position relative to the floor of the body of water in which the vessel is floating, said series of vertical members being positioned to be engaged by said paddle wheels, said paddle wheels of each of said pairs of paddle wheels being operatively interconnected to rotate in opposite directions, said paddle wheels at each of the sides of the vessel being driven in opposite directions and said paddle wheels being adapted to be driven only one of said pairs at a time by a prime mover, whereby when one of said pairs of paddle wheels is driven said one pair of paddle wheels drives said vessel in one direction by engaging said vertical members and when the other of said pairs of paddle wheels is driven said other pair of paddle wheels drives said vessel in the other direction by engaging said vertical members.

2. A water transportation system according to claim 1, in which said guide means further comprises a pair of opposed walls mounted upright on the floor of said body of water and defining a protected channel for said vessel, said vertical members being mounted atop said walls.

3. A water transportation system according to claim 2, in which said guide means further comprises a third wall mounted upright on the floor of the body of water and parallel to said pair of walls whereby two parallel protected channels are defined, and four of said series of vertical members are provided, one of said series being mounted atop each of the outside ones of said walls and two of said series being mounted atop the middle one of said walls.

4. A water transportation system according to claim 3, wherein an additional wall is mounted atop each of said series of vertical members, each of said additional walls extends upward to a like height above said vessel and a roof is provided across the top of said additional walls.

5. A water transportation system according to claim 4, further comprising braking means mounted on opposed sides of the hull of said vessel, said braking means comprising outwardly extendable members adapted to engage said first mentioned walls when extended outwardly and thereby brake the vessel.

References Cited by the Examiner

UNITED STATES PATENTS

| | | | |
|---|---|---|---|
| 380,781 | 4/1888 | Baker | 115—8 |
| 744,378 | 11/1903 | Mann | 115—8 |
| 3,033,152 | 5/1962 | LeTourneau | 115—6 |

MILTON BUCHLER, *Primary Examiner.*

FERGUS S. MIDDLETON, *Examiner.*

T. M. BLIX, *Assistant Examiner.*